US009429442B2

(12) United States Patent
Kamada et al.

(10) Patent No.: US 9,429,442 B2
(45) Date of Patent: Aug. 30, 2016

(54) NAVIGATION APPARATUS AND STORAGE MEDIUM

(71) Applicant: SONY CORPORATION, Tokyo (JP)

(72) Inventors: Yasunori Kamada, Kanagawa (JP); Yoichiro Sako, Tokyo (JP); Hiroyuki Hanaya, Kanagawa (JP); Kazunori Hayashi, Tokyo (JP); Takayasu Kon, Tokyo (JP); Akira Tange, Tokyo (JP); Takatoshi Nakamura, Tokyo (JP); Tomoya Onuma, Shizuoka (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 14/225,527

(22) Filed: Mar. 26, 2014

(65) Prior Publication Data

US 2014/0303885 A1 Oct. 9, 2014

(30) Foreign Application Priority Data

Apr. 9, 2013 (JP) ................ 2013-081132

(51) Int. Cl.
*G01C 21/34* (2006.01)

(52) U.S. Cl.
CPC ................ *G01C 21/3461* (2013.01)

(58) Field of Classification Search
CPC .......... G01C 21/3461; G01C 21/3453; G01C 21/3446; G01C 21/3469; G06K 9/00805; G06K 9/00798; A63B 24/00; G07F 17/323; H04W 48/14; G01N 15/0211; G01N 21/21; G01N 33/0075; A63F 13/12; G06F 3/048; G06F 1/1626; G05D 1/0242; H04L 12/5692; H04L 67/20
USPC .............. 701/400, 532, 533, 32, 24; 348/42; 702/182; 455/41.2, 456.3; 356/364; 715/757; 73/863.01; 370/352; 713/1
See application file for complete search history.

(56) References Cited

U.S. PATENT DOCUMENTS

| | | | | |
|---|---|---|---|---|
| 3,751,984 A | * | 8/1973 | Rennie ............... | G01N 33/0075 436/181 |
| 5,111,401 A | * | 5/1992 | Everett, Jr. .......... | G05D 1/0242 180/169 |
| 2004/0066513 A1 | * | 4/2004 | Okumura ........... | G01N 15/0211 356/364 |
| 2006/0136173 A1 | * | 6/2006 | Case, Jr. ................ | A63B 24/00 702/182 |
| 2006/0203804 A1 | * | 9/2006 | Whitmore ........... | H04L 12/5692 370/352 |
| 2008/0134056 A1 | * | 6/2008 | Shuster ................... | A63F 13/12 715/757 |
| 2010/0292914 A1 | * | 11/2010 | Vepsalainen ....... | G01C 21/3453 701/532 |
| 2011/0246754 A1 | * | 10/2011 | Porwal ................. | G06F 1/1626 713/1 |
| 2012/0158299 A1 | * | 6/2012 | Cerecke ............ | G01C 21/3446 701/533 |
| 2012/0289160 A1 | * | 11/2012 | Palin ..................... | H04W 48/14 455/41.2 |
| 2013/0027511 A1 | * | 1/2013 | Takemura .......... | G06K 9/00805 348/42 |
| 2013/0059607 A1 | * | 3/2013 | Herz ...................... | H04L 67/20 455/456.3 |

FOREIGN PATENT DOCUMENTS

| | | |
|---|---|---|
| JP | 2007-205946 | 8/2007 |
| JP | 2009-264902 | 11/2009 |
| JP | 2012-047456 | 3/2012 |

* cited by examiner

Primary Examiner — Yuri Kan
(74) Attorney, Agent, or Firm — Paratus Law Group, PLLC

(57) ABSTRACT

There is provided a navigation apparatus including an estimation section which estimates first environmental information in a movement route candidate of an object based on observation information observed in real time in the movement route candidate, an acquisition section which acquires second environmental information of a surrounding of the movement route candidate, and a guidance section which guides a movement direction for the object based on the first environmental information estimated by the estimation section and the second environmental information acquired by the acquisition section.

25 Claims, 10 Drawing Sheets

FIG. 4
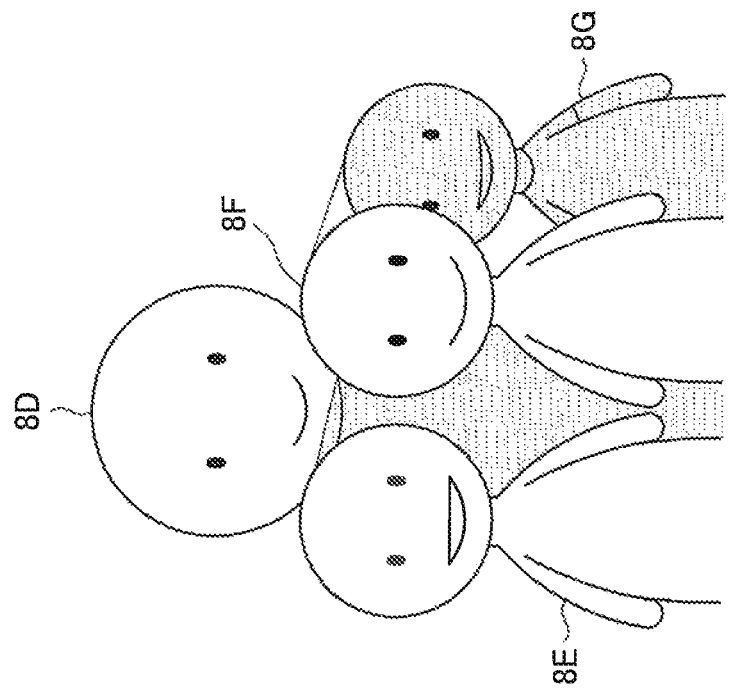
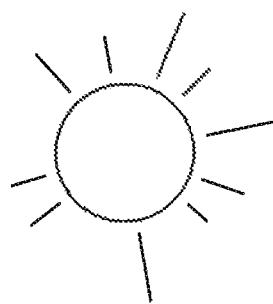

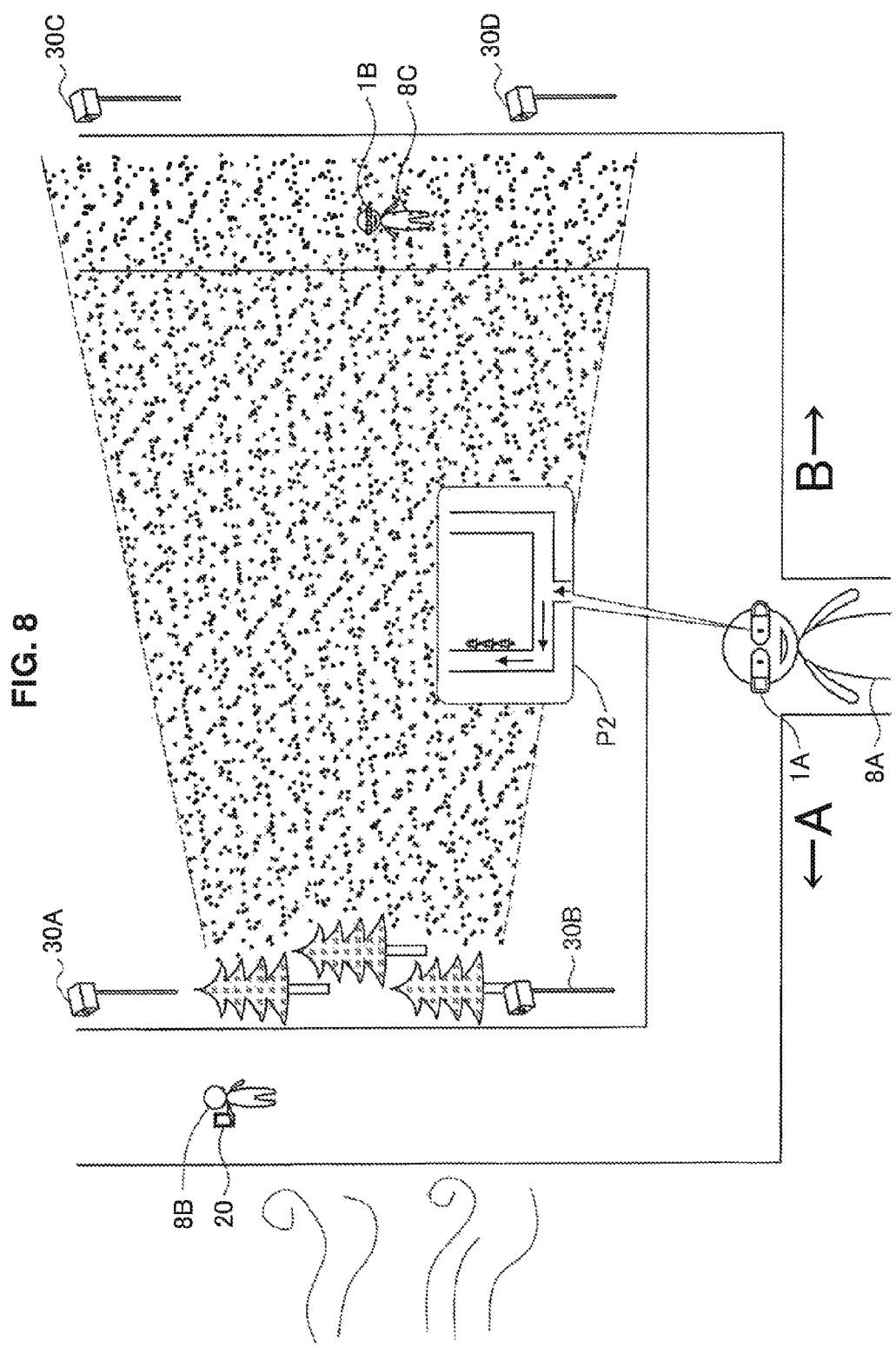

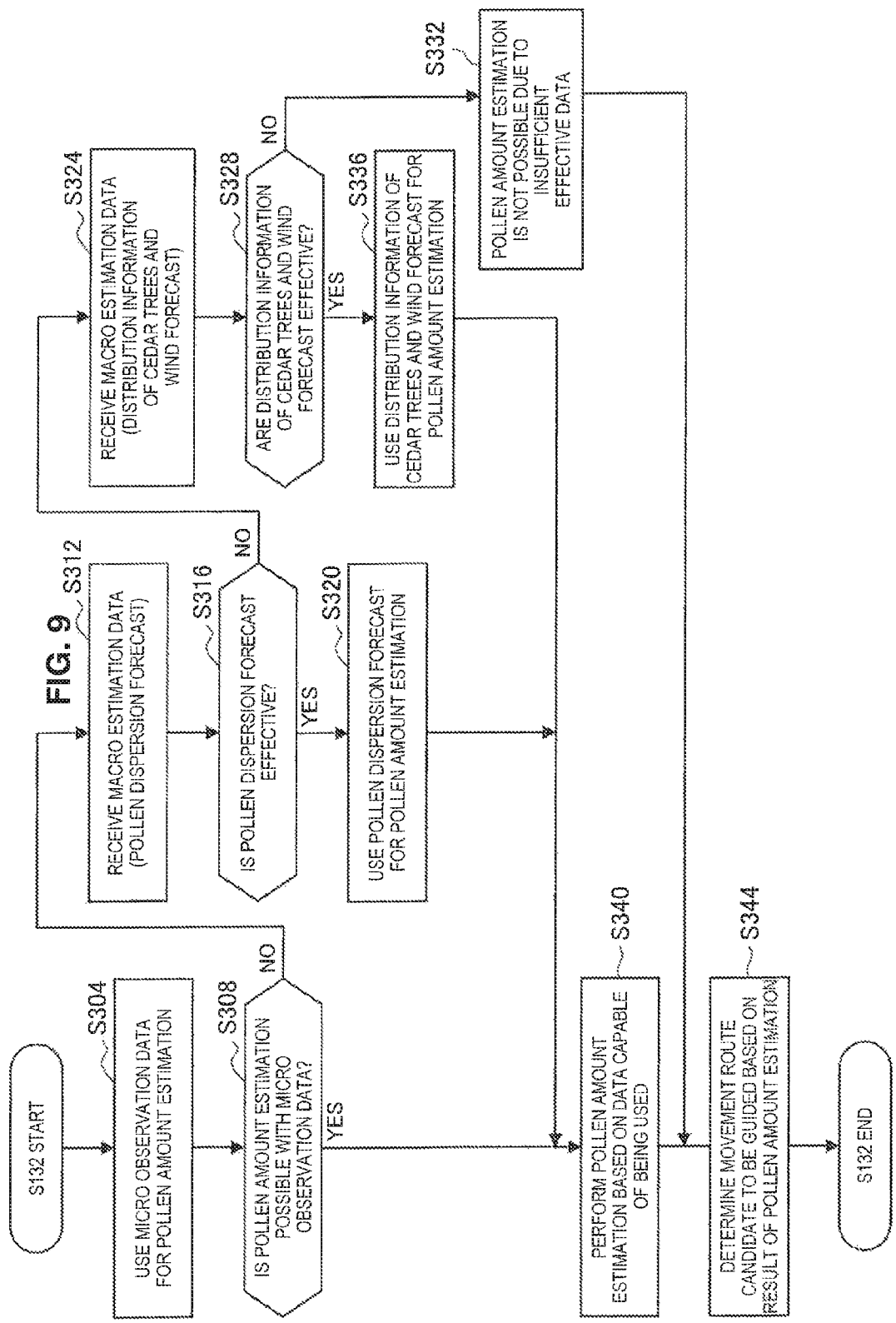

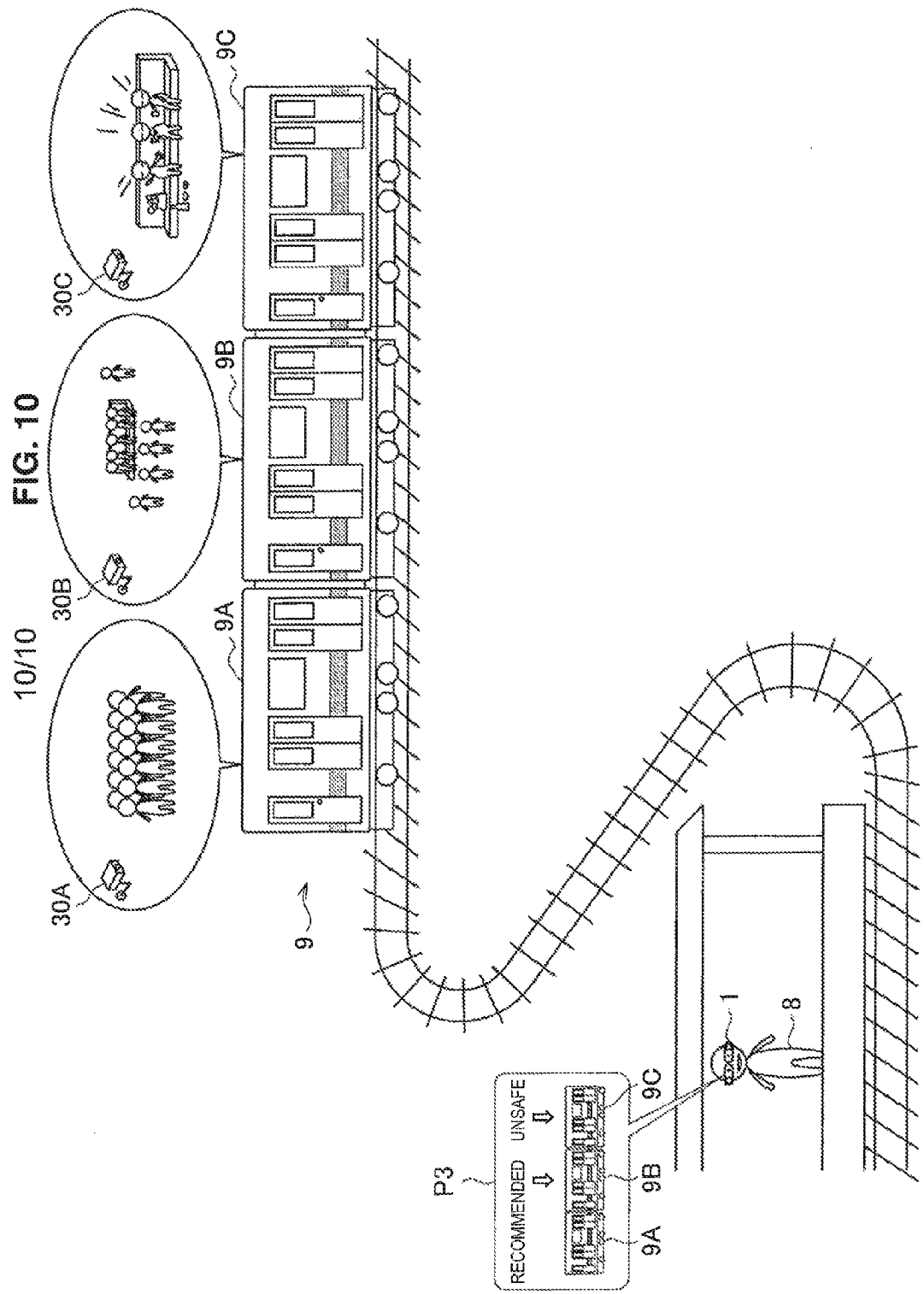

NAVIGATION APPARATUS AND STORAGE MEDIUM

CROSS REFERENCE TO RELATED APPLICATIONS

This application claims the benefit of Japanese Priority Patent Application JP 2013-081132 filed Apr. 9, 2013, the entire contents of which are incorporated herein by reference.

BACKGROUND

The present disclosure relates to a navigation apparatus and a storage medium.

In recent years, development of navigation technology which performs navigation of a route has been made for a user who walks, runs, or operates a car, ship or the like. As an example of this, technology has been developed, for a user who is driving a car, which determines a route to be guided based on whether the route is shaded or in the sun, from the viewpoint of suppressing energy consumption and a concern for the environment.

For example, JP 2012-47456A discloses technology which calculates a sunlight amount and determines a route, based on the speed limit of the route and factors which can cause delays such as temporary stops, in addition to sunlight information based on the position of the sun, the orientation of the road, surrounding buildings or the like.

Further, JP 2009-264902A discloses technology which specifies a guidance route, in accordance with the total ultraviolet ray exposure amount calculated by using a database in which an ultraviolet ray exposure amount is stored for each predetermined section.

Further, JP 2007-205946A discloses technology which performs guidance by searching again for a route which satisfies a search condition specified by a user, in the case where circumstances occur which are different from those expected at the time of performing a route search.

SUMMARY

The technology disclosed in JP 2012-47456A, JP 2009-264902A and JP 2007-205946A performs guidance for a route by performing an estimation of the overall sunlight amount based on static information, such as information of the position of the sun and surrounding buildings calculated uniquely with regards to time, or a weather forecast for each time zone intended for a region or a division. Accordingly, the technology disclosed in JP 2012-47456A, JP 2009-264902A and JP 2007-205946A is not able to perform route guidance based on automatic information such as local circumstances or changes in local conditions.

Further, since shading or exposure to the sun will influence body temperature or sunburn, not only for a user who is driving a car, but also for a user who is walking, for example, route guidance in accordance with shading or exposure to the sun will be useful.

Accordingly, the present disclosure proposes a new and improved navigation apparatus and storage medium capable of performing route guidance based on local information observed in real time.

According to an embodiment of the present disclosure, there is provided a navigation apparatus including an estimation section which estimates first environmental information in a movement route candidate of an object based on observation information observed in real time in the movement route candidate, an acquisition section which acquires second environmental information of a surrounding of the movement route candidate, and a guidance section which guides a movement direction for the object based on the first environmental information estimated by the estimation section and the second environmental information acquired by the acquisition section.

According to an embodiment of the present disclosure, there is provided a non-transitory computer-readable storage medium having a program stored therein, the program causing a computer to function as estimating first environmental information in a movement route candidate of an object based on observation information observed in real time in the movement route candidate, acquiring second environmental information of a surrounding of the movement route candidate, and guiding a movement direction for the object based on the estimated first environmental information and the acquired second environmental information.

According to one or more embodiments of the present disclosure such as described above, it is possible to perform route guidance based on local information observed in real time.

BRIEF DESCRIPTION OF THE DRAWINGS

FIG. 4 is an explanatory diagram which shows estimation based on a state of a user by the HMD according to the first embodiment;

FIG. 8 is an explanatory diagram which shows an outline of the navigation process according to a second embodiment of the present disclosure;

FIG. 9 is a flow chart which shows the operations of the HMD according to the second embodiment; and FIG. 10 is an explanatory diagram which shows an outline of the navigation process according to a third embodiment of the present disclosure.

DETAILED DESCRIPTION OF THE EMBODIMENT(S)

Figure 1:
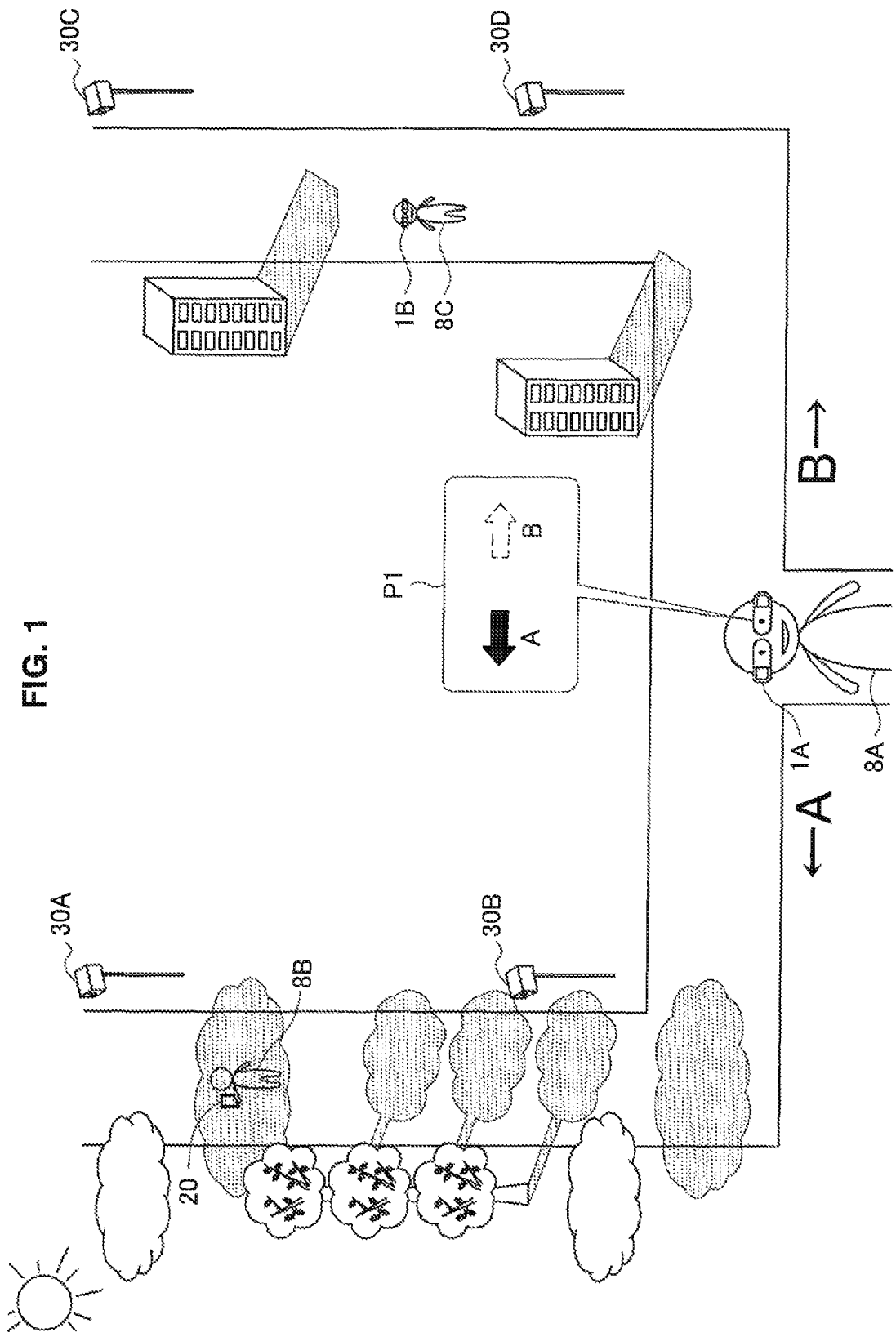
FIG. 1 is an explanatory diagram which shows an outline of a navigation process according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
1. Outline of the navigation process according to an embodiment of the present disclosure
2. The embodiments
2-1. The first embodiment
2-1-1. Configuration of the HMD
2-1-2. Operation process of the HMD
2-2. The second embodiment
2-2-1. Outline
2-2-2. Operation process of the HMD
2-3. The third embodiment
2-4. The fourth embodiment
3. Conclusion

1. OUTLINE OF THE NAVIGATION PROCESS ACCORDING TO AN EMBODIMENT OF THE PRESENT DISCLOSURE

First, an outline of a navigation process according to an embodiment of the present disclosure will be described by referring to FIG. 1.

FIG. 1 is an explanatory diagram which shows an outline of the navigation process according to an embodiment of the present disclosure. As shown in FIG. 1, a user 8A (object) is wearing a glasses type HMD (Head Mounted Display) 1A, and is standing at a junction of a movement route candidate A and a movement route candidate B. Note that, the movement route candidates are candidates of movement routes from the present position of the user 8 to a destination.

The HMD 1A has a function which performs real time guidance of a movement route candidate which satisfies an arbitrary search condition for the user 8A. For example, a movement route candidate which satisfies an arbitrary search condition is a movement route which passes through a lot of shading, a movement route which passes through a lot of exposure to sunlight, a movement route which avoids darkness, a movement route which avoids pollen, or a movement route which avoids air pollution. Alternatively, a movement route which avoids wind, a movement route which avoids crowds of people, a movement route which raises or lowers the body temperature, or a movement route which avoids radioactivity, can also be considered as a movement route candidate which satisfies an arbitrary search condition.

Here, an example will be described in which the HMD 1A guides a movement route candidate which passes through a lot of shading. The HMD 1A guides a movement route candidate which minimizes the sunlight amount, by estimating a sunlight state such as the strength of sunlight irradiated to each movement route candidate and the formed shading or exposure to the sun, and by estimating an integration amount (sunlight amount) of received sunlight or ultraviolet rays of the cases where the user 8 passes through the movement route candidates.

First, the HMD 1A estimates a sunlight state (second environmental information) of the surroundings of the movement route candidates based on static information registered in advance. For example, the HMD 1A calculates shaded regions predicted to be formed by structures, based on the position of the sun uniquely determined by time information and position information, and the position, height and shape of surrounding buildings, streetlights or the like. Note that, such shaded regions calculated based on static information may be registered in advance for each time and location, or the HMD 1A may acquire such shaded regions from a server or the like without performing estimation.

In the example shown in FIG. 1, there are buildings in the surroundings of the movement route candidate B, and shading is formed by the buildings. On the other hand, while there are no buildings in the surroundings of the movement route candidate A, more shading is formed than in the movement route candidate B due to clouds and roadside trees.

Here, while shaded regions are estimated in JP 2012-47456A, JP 2009-264902A and JP 2007-205946A which are formed by static information, that is, by buildings based on the position of the sun and the position, height and shape of the buildings, these are not the only factors in which shading is formed. As shown in FIG. 1, shading can occur due to clouds and leafy trees. However, since clouds are changing shape and moving with time and the condition of leaves will differ in accordance with the growth per year of the trees and the season, such dynamically occurring shading is not able to be estimated based on static information. Accordingly, it would be difficult to perform guidance which considers such dynamically formed shading in the technology disclosed in JP 2012-47456A, JP 2009-264902A and JP 2007-205946A. That is, only the movement route candidate B is guided in the technology disclosed in JP 2012-47456A, JP 2009-264902A and JP 2007-205946A, based on the presence of buildings, and it would be difficult to guide the movement route candidate A, in which more shading is formed than in the movement route candidate B due to clouds and roadside trees.

Accordingly, this has led to creating the navigation process according to each of the embodiments of the present disclosure by focusing on the above circumstances. The navigation process according to each of the embodiments of the present disclosure can perform guidance based on local information observed in real time, in addition to the above described static information.

Specifically, the HMD 1A (navigation apparatus) shown in FIG. 1 performs an estimation of a sunlight state by using information observed in real time by observation apparatuses and other navigation apparatuses present in the surroundings of the movement route candidates, in addition to the above described static information, and determines a movement route candidate to be guided. The observation apparatuses and navigation apparatuses may observe weather information such as pressure, temperature, wind speed or humidity, or may recognize shading or exposure to the sun from images by capturing a state of the surroundings. In FIG. 1, cameras 30A to 30D function as observation apparatuses, and a smartphone 20 of a user 8B, and an HMD 1B worn by a user 8C, function as other navigation apparatuses. Note that, hereinafter, in the case where it is not particularly necessary to differentiate the users 8A, 8B and 8C, they will be generically named a user 8. Similarly, in the case where it is not particularly necessary to differentiate the HMDs 1A and 1B, they will be generically named an HMD 1.

In the movement route candidate A, the camera 30A observes shading formed due to clouds, and the smartphone 20 and the camera 30B observe shading formed due to roadside trees. In the movement route candidate B, the HMD 1B and the cameras 30C and 30D observe that there is no shading formed in the surroundings. The HMD 1A estimates a sunlight state (first environmental information) in the case of the user 8A passing through each of the movement routes, based on these types of observation information. Specifically, the HMD 1A estimates that there is a lot of shading formed in the movement route candidate A, which is formed due to clouds and roadside trees, and that there is no shading formed in the movement route candidate B, in the case where the user is 8A passing through.

Also, the HMD 1A guides the user 8 by determining a movement route candidate which minimizes the sunlight amount, based on an estimation of a sunlight state based on the observation information, and an estimation of a sunlight state based on the above described static information. In the example shown in FIG. 1, the HMD 1A presents a guidance image P1, to the user 8, which guides the movement direction to the movement route candidate A in which the most shading is formed.

Heretofore, an outline of the navigation process according to the present embodiment has been described. To continue, a configuration and operation process of the HMD 1 (navigation apparatus), which performs the navigation process according to an embodiment of the present disclosure, will be described by referring to FIG. 2 to FIG. 7.

2. THE EMBODIMENTS

2-1. The First Embodiment 2-1-1. Configuration of the HMD

First, an external appearance configuration of the HMD 1 will be described by referring to FIG. 2.

Figure 2:
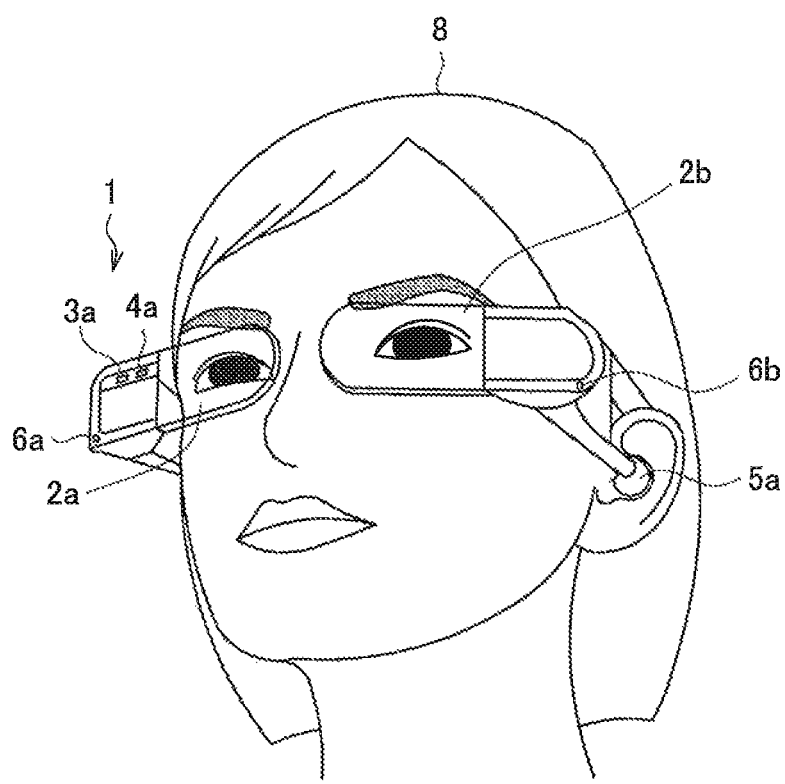
FIG. 2 is an explanatory diagram which shows an external appearance configuration of an HMD according to a first embodiment of the present disclosure.

FIG. 2 is an explanatory diagram which shows an external appearance configuration of the HMD 1 according to a first embodiment. As shown in FIG. 2, the user 8 is wearing a glasses type HMD 1. For example, the HMD 1 has a mounting unit with a half-circumferential type frame structure from both sides of the head to the back of the head, and is worn by the user 8 by placing on both ears such as shown in FIG. 2.

Further, the HMD 1 is constituted so that a display section 2, which includes a pair of a display section 2a for the left eye and a display section 2b for the right eye, is arranged directly in front of both eyes of the user 8, that is, in a position at which lenses of glasses are normally positioned. For example, captured images of a real space captured by an imaging lens 3a are displayed on the display section 2. Further, the display section 2 may be a transmission type, and by setting the display section 2 as a through state by the HMD 1, that is, as a transparent or semitransparent state, the HMD 1 will not hinder normal activities of the user 8 even if normally worn in such glasses.

Further, as shown in FIG. 2, an imaging lens 3a facing the front is arranged in the HMD 1, in a state of being worn by the user 8, no as to perform imaging by setting a direction visually confirmed by the user 8 as a photographic subject direction. In addition, a light emitting section 4a, which illuminates the imaging direction by the imaging lens 3a, is included. For example, the light emitting section 4a is formed by an LED (Light Emitting Diode).

Further, while only the left ear side is shown in FIG. 2, a pair of earphone speakers 5a, which can be inserted into the right ear and the left ear of the user 8 in a worn state, is included. Further, microphones 6a and 6b, which collect sounds from external audio, are arranged on the right of the display section 2 for the right eye and the left of the display section 2 for the left eye.

Note that, the external appearance of the HMD 1 shown in FIG. 2 is an example, and various structures can be considered for the user 8 to wear the HMD 1. The HMD 1 may be formed by a mounting unit set as a common glasses type or a head mounted type, and the display section 2 near to the front of the eyes of the user 8 can be included as at least one form of the present embodiment. Further, apart from including the display section 2 as a pair corresponding to each eye, the display section 2 may be constituted by including one section corresponding to the eye of one side.

Further, while the imaging lens 3a and the light emitting section 4a which performs illumination are arranged facing the front on the right eye side in the example shown in FIG. 2, they may also be arranged on the left eye side, or may be arranged on both sides.

Further, one of the earphone speakers 5a may be included to be worn only on one ear, without left and right stereo speakers. Further, there may be one microphone out of the microphones 6a and 6b.

In addition, a configuration can also be considered which does not include the microphones 6a and 6b and the earphone speakers 5a. Further, a configuration can also be considered which does not include the light emitting section 4a.

Heretofore, an external appearance configuration of the HMD 1 has been described. To continue, an internal configuration of the HMD 1 will be described by referring to FIG. 3.

Note that, while the HMD 1 is used as an example of a navigation apparatus which performs the navigation process in the present embodiment, the navigation apparatus according to an embodiment of the present disclosure is not limited to the HMD 1. For example, the navigation apparatus may be a smartphone, a mobile phone terminal, a PDA (Personal Digital Assistant), a PC (Personal Computer), a tablet terminal or the like.

Figure 3:
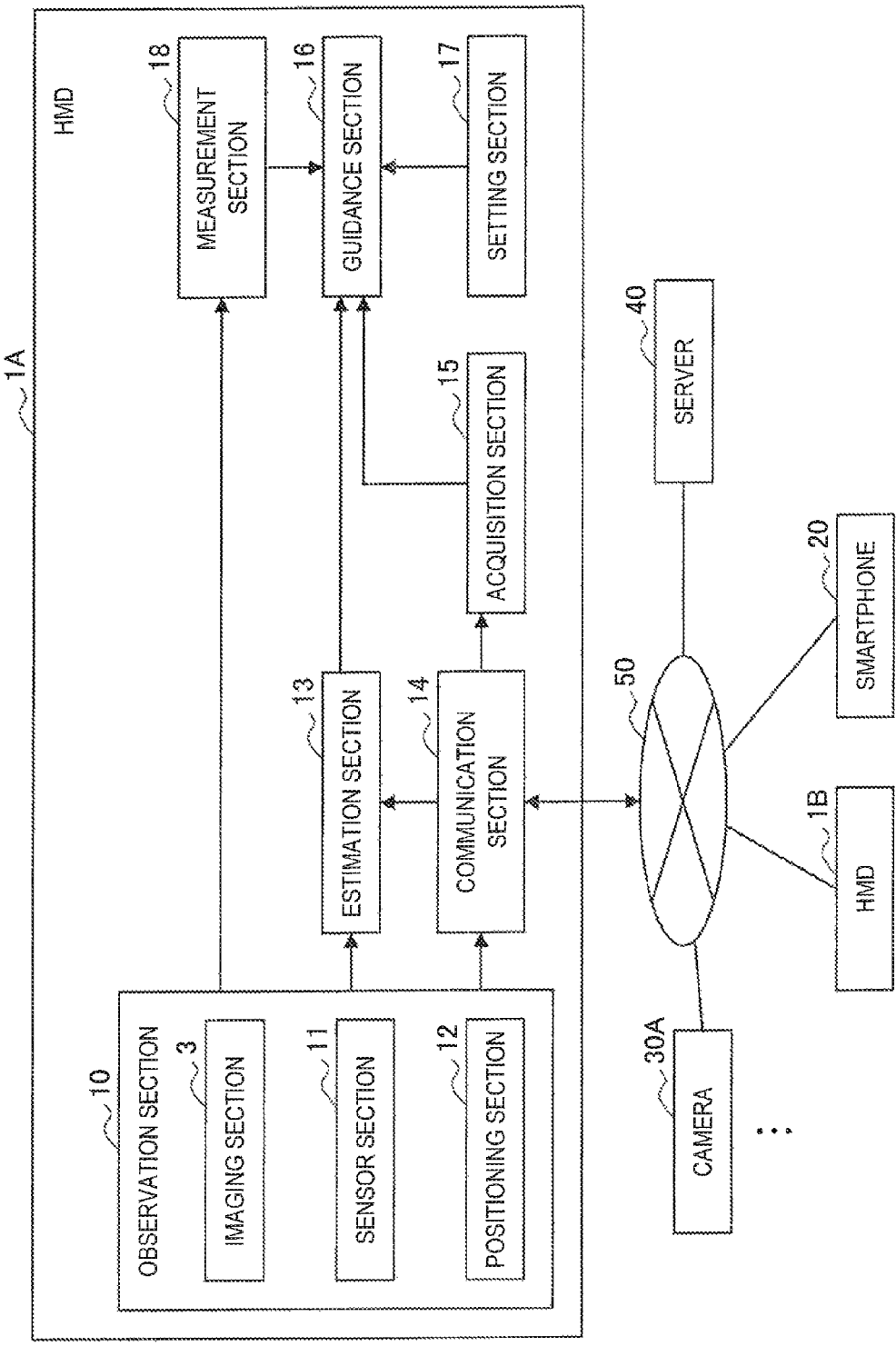
FIG. 3 is a block diagram which shows an internal configuration of the HMD according to the first embodiment.

FIG. 3 is a block diagram which shows an internal configuration of the HMD 1 according to the first embodiment. In FIG. 3, an internal configuration of the HMD 1A shown in FIG. 1 is shown as an example, and the HMD 1A is shown connected to a smartphone 20, cameras 30A to 30D and a server 40 by a network 50. As shown in FIG. 3, the HMD 1A has an observation section 10, an estimation section 13, a communication section 14, an acquisition section 15, a guidance section 16, a setting section 17, and a measurement section 18. Note that, in the present embodiment, the HMD 1A will be described as guiding a movement route candidate which passes through a lot of shading.

(Observation Section 10)

The observation section 10 has a function which observes local (micro) information of the surroundings of the user 8. Observation information observed by the observation section 10 will hereinafter be called micro observation data. The micro observation data in the present embodiment is real time information related to sunlight or ultraviolet rays. The observation section 10 functions as an imaging section 3, a sensor section 11 and a positioning section 12, and outputs the observed micro observation data to the estimation section 13, the communication section 14 and the measurement section 18.

Imaging Section 3

The imaging section 3 has a lens system which is constituted by the imaging lens 3a, an aperture, a zoom lens and a focus lens, a driving system which allows focus operations and zoom operations to be performed in the lens system, and a solid-state imaging sensor array which generates imaging signals by photoelectrically converting captured light obtained by the lens system. For example, the solid-state imaging sensor array may be implemented by a CCD (Charge Coupled Device) sensor array, or a CMOS (Complementary Metal Oxide Semiconductor) sensor array. The imaging section 3 outputs data of captured images which are digital signals.

Further, the imaging section 3 may additionally have an illumination section 4 which includes the light emitting section 4a shown in FIG. 2 and a light emitting circuit allowing the light emitting section 4a (for example, an LED) to perform light emission. Also, when capturing images, the imaging section 3 may perform imaging upon illuminating the visual field direction of the user 8, by allowing the illumination section 4 to perform light emission to the front.

The imaging section 3 images the surroundings of the user 8, and outputs the captured images as micro observation data. Note that, the imaging section 3 not only captures images in the direction which the user 8 is facing, but may also capture images behind, to the sides, on the ground or above the user 8.

Sensor Section 11

The sensor section 11 has a function which observes weather information, such as temperature, body temperature, dew point temperature, wet bulb temperature, wind speed, maximum wind speed, average wind speed, wind orientation, humidity, relative humidity, pressure and light amount. Alternatively, the sensor section 11 may observe pollen, air pollution, odorous substances, radiation or the like. Further, the sensor section 11 has a sound input section 6 which includes the microphones 6a and 6b shown in FIG. 2, and observes sounds of the surroundings. Further, the sensor section 11 may observe the body temperature, perspiration, respiration and movement speed of the user 8. The sensor section 11 outputs these types of observed information as micro observation data.

Positioning Section 12

The positioning section 12 detects the position at which the HMD 1A is present, by receiving radio waves from a GPS (Global Positioning System) satellite, and outputs the detected position information. Note that, the positioning section 12 is an example of a position information acquisition section which detects the position of the HMD 1A based on acquired signals from the outside, and an example of the positioning section according to the present embodiment is not limited to this. For example, the positioning section may detect a position by WiFi, transmission/reception with a mobile phone, PHS, smartphone or the like, or near distance communication. The positioning section 12 outputs the acquired position information as micro observation data.

(Communication Section 14)

The communication section 14 is a communication module for performing transmission/reception of data between information processing apparatuses connected to the network 50 by wires or wirelessly. For example, the communication section 14 performs transmission/reception of micro observation data, between observation apparatuses or navigation apparatuses connected to the network 50. In the example shown in FIG. 3, the communication section 14 receives micro observation data observed from each of the cameras 30A to 30D, which are observation apparatuses having the same functions as the above described observation section 10, installed in and near the movement route candidates. Further, the communication section 14 receives micro observation data observed from the HMD 1B and the smartphone 20, which are other navigation apparatuses present in and near the movement route candidates. Alternatively, the communication section 14 may receive micro observation data from an arbitrary portable weather observation apparatus. Further, the communication section 14 transfers the micro observation data output from the sensor section 11 to the HMD 1B and the smartphone 20, for the navigation processes in the HMD 1B and the smartphone 20.

Note that, the transmission/reception of these types of micro observation data may be performed via the server 40.

Further, macro estimation data, which will be described later, is registered in advance in the server 40, and the communication section 14 receives, from the server 40, macro estimation data corresponding to the present position acquired by the positioning section 12.

The communication section 14 outputs the received micro observation data to the estimation section 13, and outputs the macro estimation data to the acquisition section 15.

(Estimation Section 13)

The estimation section 13 has a function which estimates a sunlight state (first environmental information) in the movement route candidates based on the micro observation data observed in real time in the movement route candidates of the user 8. The sunlight state is information related to sunlight or ultraviolet rays irradiated in the case of the user 8 moving in the movement route candidates. More specifically, the sunlight state is information which shows the strength of sunlight or ultraviolet rays irradiated in the movement route candidates, the light amount, or the size and range of formed shading or exposure to the sun. Alternatively, the sunlight state may include weather forecast information in the movement route candidates.

Here, the micro observation data observed in real time in the movement route candidates of the user 8 is micro observation data observed by the sensor section 11, and micro observation data observed by other observation apparatuses or navigation apparatuses, which has been received by the communication section 14.

The estimation section 13 estimates a sunlight state in the movement route candidates, based on captured images output from the imaging section 3, or captured images captured in and near the movement route candidates and received by the communication section 14, which is one part of the micro observation data. For example, the estimation section 13 estimates a sunlight state, by estimating shading formed in the movement route candidates from the captured images. Specifically, the estimation section 13 recognizes that regions with a low luminance in the captured images are shaded regions, recognizes that regions with a high luminance are sun exposed regions, and estimates a sunlight state due to shading formed in the movement route candidates based on these types of recognition results. Further, the estimation section 13 estimates a sunlight state due to shading formed by clouds, by recognizing the amount and flow of clouds from the captured images. Further, the estimation section 13 estimates a sunlight state by estimating that a lot of shading will be formed in the case where there are tall trees with many leaves, by recognizing the height and leaf amount of trees present in and near the movement route candidates from captured images, and estimating that less shading will be formed in the case where there are low trees and a small leaf amount. Further, the estimation section 13 estimates a sunlight state due to shading formed by moving bodies, by recognizing moving bodies such as people or vehicles which are present in and near the movement route candidates from captured images. Further, the estimation section 13 estimates a sunlight state due to reflections, by recognizing reflections from reflective bodies such as buildings, the ground or snow surfaces in and near the movement route candidates from captured images. Further, the estimation section 13 estimates a sunlight state in the movement route candidates, based on weather information which is one part of the micro observation data. For example, the estimation section 13 estimates a sunlight state due to the occurrence of clouds based on the level and change of pressure, or estimates a sunlight state due to the intensity of sunlight.

Here, the estimation section 13 estimates a sunlight state of the time at which the HMD 1A may arrive at a position where micro observation data is observed, by calculating the position at which the micro observation data is observed and the position of the HMD 1A, and an arrival time at each position using the moving speed of the user 8. However, in order to simplify the description in the present disclosure, the estimation section 13 will estimate a sunlight state, by setting a sunlight state of the present time, at the position at which the micro observation data is observed, to not change even at the arrival time.

In the example shown in FIG. 1, the estimation section 13 first recognizes that a lot of shading is formed in the movement route candidate A, based on captured images of shading formed due to clouds or roadside trees captured by the camera 30A, the smartphone 20, and the camera 30B. Then, the estimation section 13 estimates a sunlight state, by estimating that the recognized a lot of shading is formed without changing, in the case of the user 8A passing through the movement route candidate A.

Similarly, the estimation section 13 first recognizes that there is no shading formed in the movement route candidate B, based on captured images of sun exposure captured by the HMD 1B, and the cameras 30C and 30D. Then, the estimation section 13 estimates a sunlight state, by setting that there is no shading formed, which is unchanging, in the case of the user 8A passing though the movement route candidate B.

The estimation section 13 outputs information which shows the sunlight state estimated based on the micro observation data to the guidance section 16.

(Acquisition Section 15)

The acquisition section 15 has a function which acquires a sunlight state (second environmental information) of the surroundings of the movement route candidates based on static information. Information which shows a static sunlight state acquired by the acquisition section 15 will hereinafter be called macro estimation data. The macro estimation data is different to the micro observation data, and is information which is registered in advance for each time and location. More specifically, the macro estimation data is static information related to sunlight or ultraviolet rays irradiated in the case of the user 8 moving in the movement route candidates. For example, the macro estimation data includes information for calculating approximately unchanging shaded regions for each time and location, such as structure information such as the position, height and shape of structures in the surroundings of the movement route candidates, and geographic information such as the inclination or geographic features of the ground which can influence the incident angle of sunlight. Alternatively, the macro estimation data includes weather information, such as weather forecast information for each prescribed time zone intended for some region, which has been issued by the Meteorological Agency or other organizations, intensity information of sunlight due to the weather, and satellite photographs.

Note that, the HMD 1 can calculate shaded regions formed due to structures, based on structure information and geographic information, by calculating the position of the sun based on the position information and time information. Such calculations may be performed by the guidance section 16, which will be described later, or may be performed in advance by the server 40 or the like.

Such macro estimation data is retained in the server 40, and is received by the communication section 14. Note that, a storage section of the HMD 1, which is not illustrated, may store the macro estimation data, or the acquisition section 15 may acquire the macro estimation data without communicating with the server 40. The acquisition section 15 outputs the acquired macro estimation data to the guidance section 16.

(Measurement Section 18)

The measurement section 18 has a function which measures an actual integration amount, in which an influence amount received from an external environment is integrated, of the cases of the user 8 moving in the movement route candidates. For example, the measurement section 18 measures an actual integration amount, by integrating the irradiated amount of sunlight or ultraviolet rays of the cases of the user 8 moving in the movement route candidates. Hereinafter, such an actual integration amount will be called an actual sunlight amount.

The measurement section 18 measures an actual integration amount, based on the micro observation data output by the observation section 10. For example, the measurement section 18 measures an actual sunlight amount, based on a time or area of shaded or sun exposed regions formed on the body surface of the user 8, which is recognized based on images of the user 8 himself or herself captured by the imaging section 3, and a temperature or light amount observed by the sensor section 11.

The measurement section 18 outputs the measured actual integration amount to the guidance section 16.

(Setting Section 17)

The setting section 17 has a function as a destination setting section which sets a destination and various search conditions for guiding by the guidance section 16, and a function as a threshold setting section which sets a limiting value (second threshold) of the actual integration amount to be used in the guidance section 16. The setting section 17 sets the destination, search condition and limiting value, based on an input by the user 8, such as a user voice input to an audio input section 6, the recognition of gestures captured by the imaging section 3, or the pressing of buttons, which are not shown in the figure.

However, the destination may not necessarily be set based on an input by the user 8. In the case where a destination for applications such as walking has not been input by the user 8, the setting section 17 sets an arbitrary destination in accordance with a state of the surroundings corresponding to a search condition at the present time, and the destination is allowed to be changed in accordance with changes in the state of the surroundings. For example, if a search condition is to pass through a lot of shading, the setting section 17 sets an arbitrary destination so as to pass through a lot of shading, in accordance with a sunlight state of the surroundings at the present time. Also, the setting section 17 is allowed to change the set destination, in accordance with changes in the estimated arrival time for each point included in the movement route candidates, or changes in the micro observation data such as an enlargement or reduction of shading. In this way, the HMD 1 can guide a walking course of shading for the user 8 who is walking, even in the case where a destination has not been set by the user 8. The setting section 17 may set the walking time or number of steps for a walking application.

Various search conditions capable of being set by the setting section 17 can be considered. For example, the setting section 17 can obtain the search conditions of passing through a lot of shading, passing through a lot of exposure to the sun, avoiding darkness, avoiding pollen, avoiding air pollution, avoiding wind, avoiding crowds of people, having a high or low body temperature, and avoiding radiation. Alternatively, the setting section 17 may receive information which shows a state of the clothing, height or the like of the user 8, which will be described later, as a search condition.

The setting section 17 outputs the set destination, search condition and limiting value to the guidance section 16.

(Guidance Section 16)

The guidance section 16 has a function which guides the movement direction for the user 8, based on an estimation based on the micro observation data by the estimation section 13, and the macro estimation data acquired by the acquisition section 15. The guidance section 16 determines a movement route candidate, by preferentially adopting the estimation based on the micro observation data by the estimation section 13, and guides the movement direction. At this time, in the case where the amount of micro observation data is insufficient, or in the case where it is difficult to set a movement route candidate with only the estimation based on micro observation data, the guidance section 16 performs guidance by additionally combining macro estimation data and determining a movement route candidate.

More specifically, the guidance section 16 guides the movement direction based on an estimated influence amount, by estimating an influence amount per unit time or unit distance received from an external environment of the cases where the user 8 moves in the movement route candidates. The guidance section 16 guides the movement direction by prioritizing a movement route candidate which minimizes or maximizes an integration amount of the estimated influence amount. For example, the guidance section 16 guides a movement route candidate which minimizes an integration amount of sunlight for the user 8 to pass through a lot of shading, and inversely guides a movement route candidate which maximizes an integration amount of sunlight for the user 8 to pass through a lot of exposure to the sun. Alternatively, the guidance section 16 may guide the movement direction by prioritizing a movement route candidate in which the estimated influence amount does not exceed an upper limit value (first threshold) or exceeds a lower limit value (second threshold). For example, the guidance section 16 guides a movement route candidate in which the amount of exposed sunlight per unit time does not exceed a normal upper limit value, so that the user 8 is not exposed to intense sunlight, and inversely guides a movement route candidate in which the amount of exposed sunlight per unit time exceeds a normal lower limit value, in this way, the HMD 1 can guide a movement route candidate which passes though cool shading for the user 8, in the summer season where the sunlight is intense and the temperature is high, and inversely can guide a movement route candidate which passes through warm exposure to the sun for the user 8, in the winter season where shading is weak and the temperature is low.

In the present embodiment, first the guidance section 16 calculates a sunlight amount for each of the movement route candidates, by integrating an irradiation amount (influence amount) per unit time or unit distance of irradiated sunlight or ultraviolet rays irradiated of the cases where the user 8 moves in the movement route candidates, based on a sunlight state estimated by the estimation section 13. At this time, since there is no micro observation data related to a certain region or location, for example, there will be cases where the guidance section 16 is not able to calculate a sunlight amount due to insufficient data. In this case, the guidance section 16 calculates a sunlight amount by supplementing the insufficient data with macro estimation data. Also, the guidance section 16 guides the movement direction for the user 8 to take, by prioritizing a movement route candidate which minimizes the sunlight amount estimated to be received in the case where the user 8 moves from the present position up to the destination. Note that, hereinafter, calculating the sunlight amount estimated to be received in the case where the user 8 moves from the present position up to the destination will be called sunlight amount estimation.

For example, the guidance section 16 calculates an integration amount based on a sunlight state estimated by the estimation section 13, for points at which micro observation data can be acquired. On the other hand, in the case where micro observation data of a certain region is not able to be acquired, the guidance section 16 calculates an integration amount by calculating the position of the sun based on the position information and arrival time of this point, and estimating shading formed due to structures of the surroundings. Also, the guidance section 16 guides a movement route candidate for the user 8, which minimizes the sunlight amount estimated to be received in the case of moving from the present position to the destination, based on these types of a calculated integration amount.

Note that, the guidance section 16 may guide by performing more accurate sunlight amount estimation, by correcting an estimation of a sunlight state using the macro estimation data, even in the case where it is possible to perform guidance with only the micro observation data.

Further, the guidance section 16 is allowed to change the movement direction to be guided, in accordance with changes in the arrival time for each pint included in the movement route candidates, and changes of estimations based on changes of micro observation data. For example, in the case where the arrival time has changed by the occurrence of traffic congestion or crowds of people in the movement route candidates, or in the case where sudden changes in the weather has been observed, the guidance section 16 is allowed to change the movement direction in accordance with these changes.

Further, the guidance section 16 guides the movement route candidate based on a state of the user 8. For example, the state of the user 8 is an area, shape or angle of an exposed skin portion of the user 8, such as the height or clothing of the user 8. In the present embodiment, the guidance section 16 calculates the sunlight amount directly irradiated onto the skin of the user 8, in accordance with the height and clothing of the user 8. Hereinafter, sunlight amount estimation based on a state of the user 8 will be described by referring to FIG. 4 and FIG. 5.

FIG. 4 is an explanatory diagram which shows sunlight amount estimation based on a state of the user 8 by the HMD 1 according to the first embodiment. As shown in FIG. 4, users 8E and 8F with approximately the same height are standing in front, and a user 8D with a higher height than the user 8E, and a user 8G with a lower height than the user 8F, are standing behind. Since the user 8D has a higher height than the user 8E, shading formed due to the user 8E does not reach the face of the user 8D, and the face (skin) of the user 8D receives sunlight. On the other hand, since the user 8G has a lower height than the user 8F, shading formed due to the user 8F covers the user 8G, and the user 8G does not receive sunlight on the exposed skin portions of the face and arms. In this way, there will be differences as to whether or not direct sunlight is received on the skin according to body height, even under the same environment. Accordingly, the guidance section 16 calculates a sunlight amount for the exposed skin, in accordance with the height of the user 8.

Figure 5:
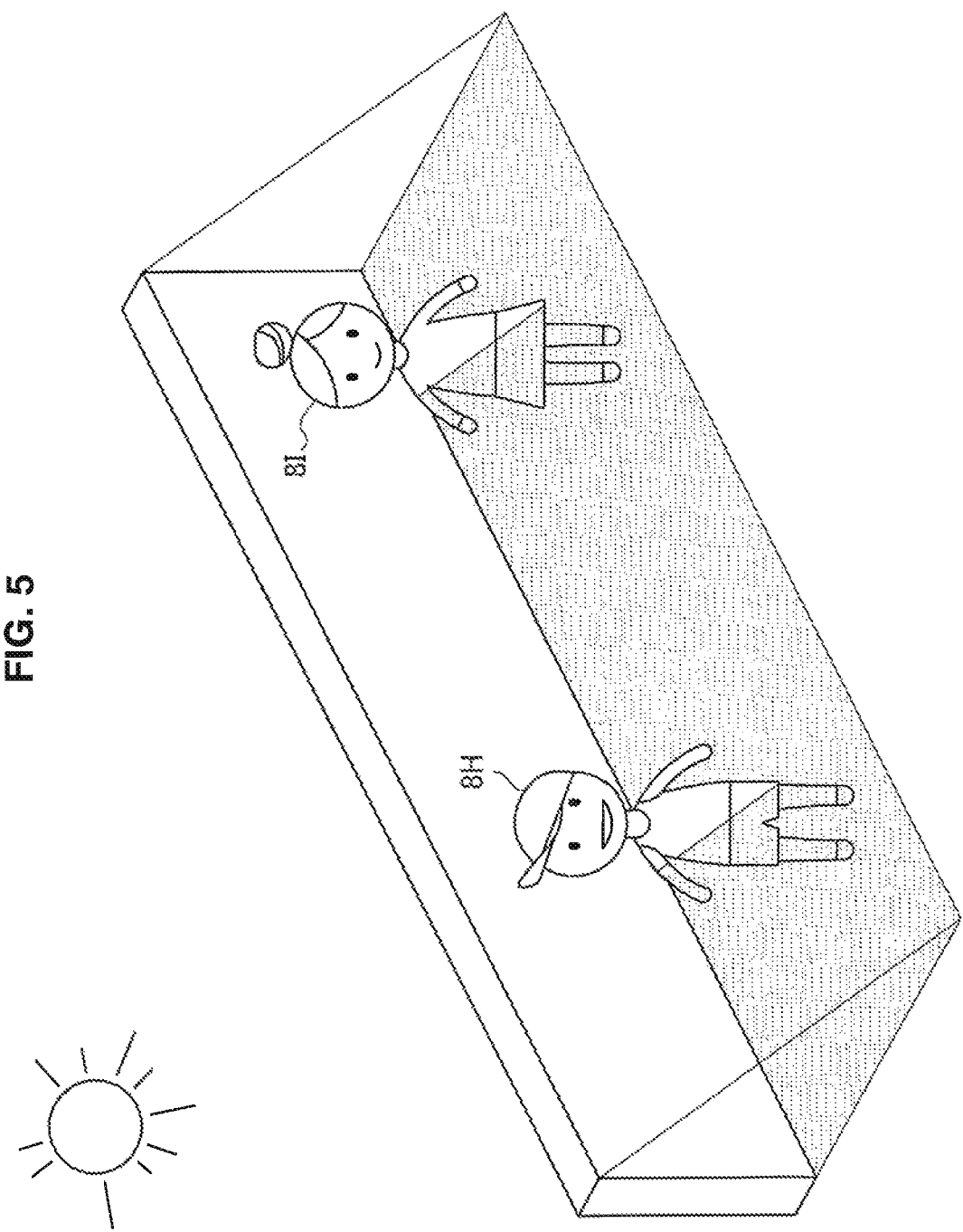
FIG. 5 is an explanatory diagram which shows estimation based on a state of a user by the HMD according to the first embodiment.

FIG. 5 is an explanatory diagram which shows sunlight amount estimation based on a state of the user 8 by the HMD 1 according to the first embodiment. As shown in FIG. 5, users 8H and 8I are walking near a wall, and shading is formed due to the wall over the entire region from part of the upper body to the lower body of the users 8H and 8I. Here, since the user 8H is wearing a sleeveless shirt, he receives sunlight on his arms. On the other hand, since the user 8I is wearing a long-sleeved shirt, she does not receive sunlight on her arms. Further, while the user 8I is wearing a mini skirt, since shading is formed on the lower half of the body, she does not receive sunlight on her legs. In this way, there will be differences as to whether or not direct sunlight is received on the skin according to clothing, even under the same environment. Accordingly, the guidance section 16 calculates a sunlight amount for the exposed skin, in accordance with the clothing of the user 8.

Alternatively, the guidance section 16 may perform sunlight amount estimation in accordance with accessories, such as a mask or glasses worn by the user 8, or the length or amount of hair, as a state of the user 8.

In this way, by performing an estimation based on a state of the user, the HMD 1 not only guides a movement route candidate which simply avoids sunlight, but can also guide a movement route candidate in which direct sunlight or ultraviolet rays are not irradiated onto skin exposed to the sun. Further, the HMD 1 can prevent harmful ultraviolet rays from being directly irradiated onto the skin.

Further, the guidance section 16 guides warning information which shows that an actual integration amount measured by the measurement section 18 has exceeded or may possibly exceed a limiting value set by the setting section 17. Accordingly, the user 8 can know in real time that an influence amount actually received from an external environment by the user himself or herself is close to exceeding or has exceeded a limiting value. In this way, the user 8 to whom the warning information is guided can set a stricter search condition to the setting section 17. In the present embodiment, the guidance section 16 guides warning information, in the case where an actual sunlight amount measured by the measurement section 18 has exceeded or will possibly exceed a limiting value.

The guidance section 16 has an audio output section 5, which includes the pair of earphone speakers 5a described above by referring to FIG. 1, and the display section 2, and performs guidance of a movement direction for the user 8. For example, the guidance section 16 performs guidance of a movement direction, by an audio guide by the audio output section 5 or a direction display by the display section 2. Note that, the guidance section 16 may perform guidance, not only by displaying the movement direction, but also by displaying the movement route candidate to be guided on a map.

(Supplementation)

The HMD 1 may switch the movement route candidate to be guided, in accordance with the body temperature, perspiration or respiration of the user 8 observed in real time by the sensor section 11. For example, in the case where there is a decrease in the body temperature of the user 8, a movement route candidate may be guided which has a lot of sunlight, or in the case where of a lot of perspiration or coarse respiration, a movement route candidate may be guided which has a lot of shading.

Further, the HMD 1 can perform guidance intended not only for the user 8 who is walking, but also for the user 8 who is driving a car, for example. Further, in the case where the driven car is a solar car, the HMD 1 can guide a movement route candidate for the user 8 which maximizes the sunlight amount irradiated onto solar panels, in accordance with a state of the height, position, area, shape, angle or the like formed by the solar panels. Further, not limited to the HMD 1, the movement route candidate may be guided for objects such as cars, vehicles, airplanes, ships and man-made satellites, by an arbitrary information processing apparatus.

Heretofore, an internal configuration of the HMD 1 has been described. To continue, an operation process of the HMD 1 will be described by referring to FIG. 6 and FIG. 7.

2-1-2. Operation Process of the HMD

Figure 6:
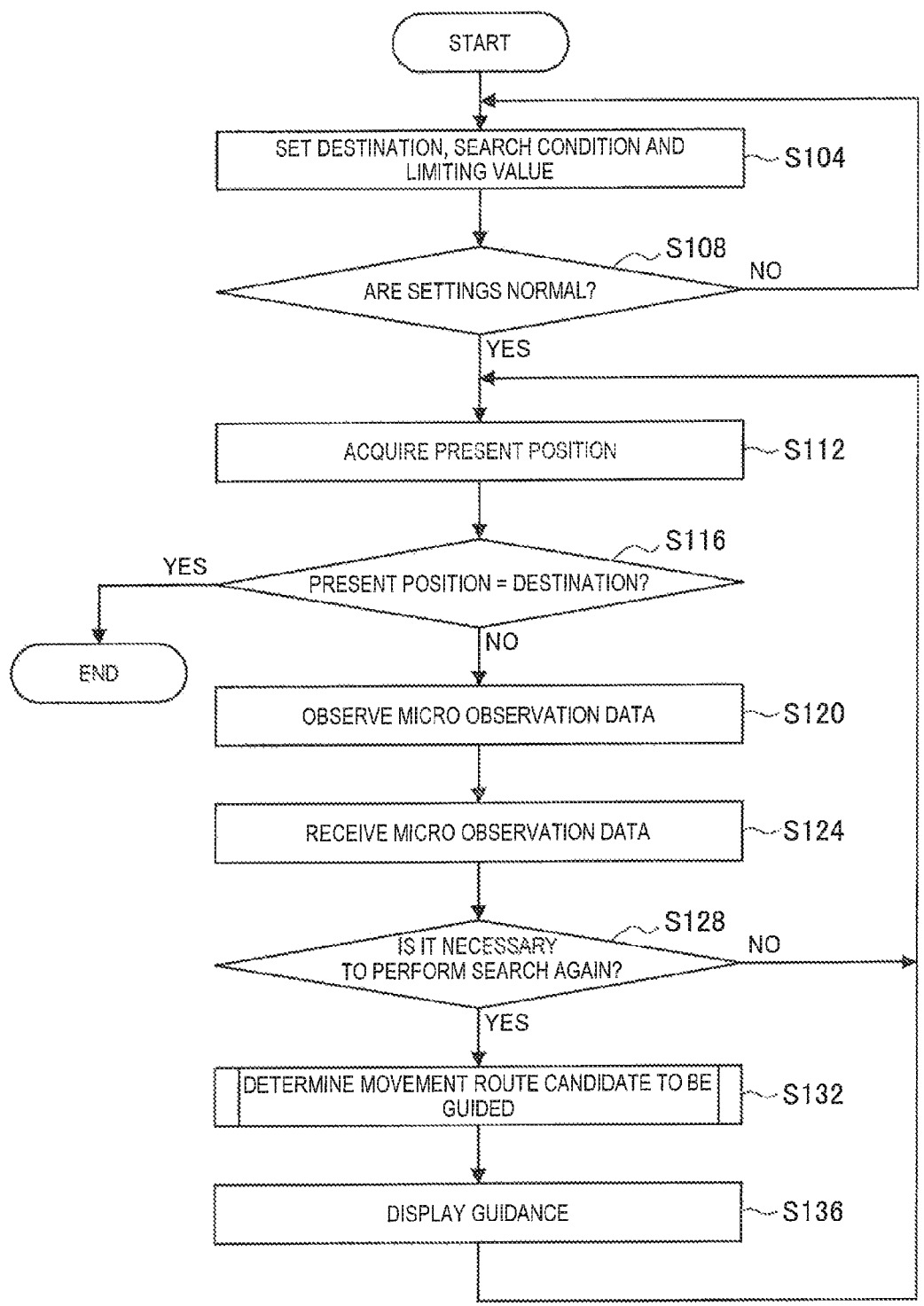
FIG. 6 is a flow chart which shows the operations of the HMD according to the first embodiment.

FIG. 6 is a flow chart which shows the operations of the HMD 1 according to the first embodiment. As shown in FIG. 6, first in step S104, the setting section 17 sets as destination, search condition and limiting value, by an input from the user 8. Here, the setting section 17 sets passing through a lot of shading as a search condition.

Next, in step S108, the setting section 17 judges whether or not the settings are normal.

In the case where the settings are abnormal (S108/NO), the process returns again to step S104.

On the other hand, in the case where the settings are normal (S108/YES), in step S112, the positioning section 12 acquires the present position of the HMD 1.

Next, in step S116, the guidance section 16 judges whether or not the present position acquired by the positioning section 12 matches the destination.

In the case where the present position matches the destination (S116/YES), the HMD 1 ends guidance.

On the other hand, in the case where the present position does not match the destination (S116/NO), in step S120, the observation section 10 observes micro observation data. For example, the imaging section 3 captures images of the surroundings, and the sensor section 11 observes weather information such as temperature and wind orientation.

Next, in step S124, the communication section 14 receives micro observation data from the outside. In more detail, the communication section 14 receives, as micro observation data, real time information related to sunlight or ultraviolet rays, which is observed by the camera 30 installed in the surroundings of a movement route candidate, or the smartphone 20 or HMD 1 of another user 8 present in the surroundings of a movement route candidate. Note that, the communication section 14 receives micro observation data observed in a range of the movement route candidates which can be guided by the guidance section 16, based on the present position and destination acquired in step S112.

Next, in step S128, the guidance section 16 judges whether or not necessary to search again for a movement route candidate. For example, the guidance section 16 judges that it is necessary to search again in the case where there has been an unexpected change in the micro observation data received or observed, and judges that it is not necessary in the case where there is no such change. Alternatively, the guidance section 16 may judge that it is necessary to search again, in the case where an actual integration amount observed by the measurement section 18 has exceeded or may possibly exceed a limiting value. At this time, the guidance section 16 may guide warning information along with performing a search again.

In the case where it is judged that it is not necessary to perform a search again (S128/NO), the process returns again to step S112.

In the case where it is judged that it is necessary to perform a search again (S128/YES), in step S132, the guidance section 16 determines a movement route candidate to be guided. Since the process in step S132 will be described later by referring to FIG. 7, a detailed description will be omitted here.

Then, in step S136, the guidance section 16 displays, on the display section 2, the movement direction for guiding the user 8 in the determined movement route candidate.

Heretofore, an operation process of the HMD 1 has been described by referring to FIG. 6. To continue, the detailed process in step S132 shown in FIG. 6 will be described by referring to FIG. 7.

Figure 7:
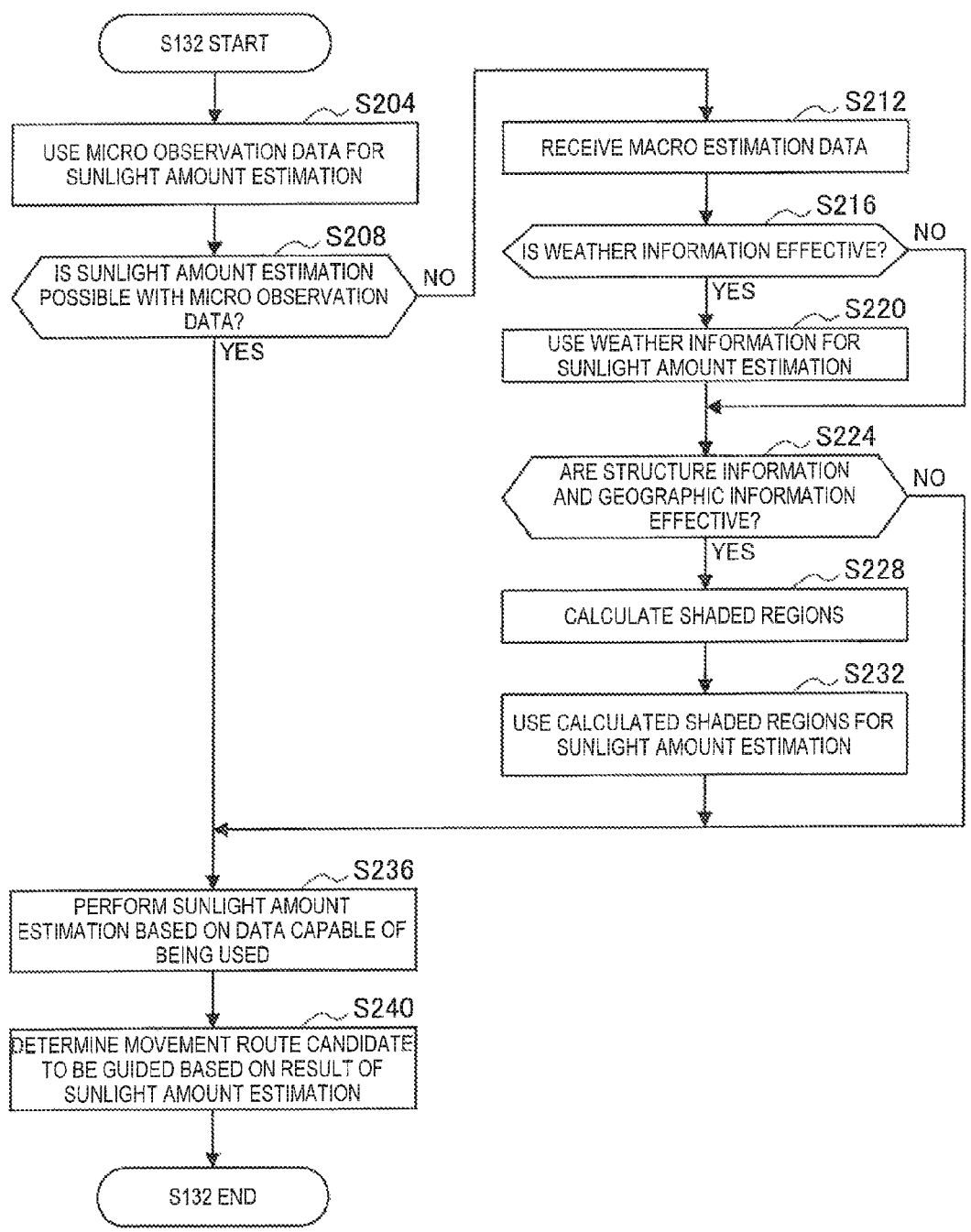
FIG. 7 is a flow chart which shows the operations of the HMD according to the first embodiment.

FIG. 7 is a flow chart which shows the operations of the HMD 1 according to the first embodiment. As shown in FIG. 7, first in step S204, the guidance section 16 determines micro observation data observed by the observation section 10 (FIG. 6, step S120), and micro observation data received by the communication section 14 (FIG. 6, step S124), to be used for sunlight amount estimation.

Next, in step S208, the guidance section 16 judges whether or not sunlight amount estimation is possible with only the micro observation data. For example, in the case where there are points in the movement route candidates which do not have micro observation data, or in the case where unexpected values are included, the guidance section 16 judges that sunlight amount estimation is not possible, and in the case where the data amount or data acquisition period is sufficient, the guidance section 16 judges that sunlight amount estimation is possible.

In the case where sunlight amount estimation is possible with only micro observation data (S208/YES), the process proceeds to step S236, which will be described later, and the HMD 1 performs sunlight amount estimation without using macro estimation data. Since the micro observation data is real time information, the HMD 1 can perform estimation with short-term and locally high accuracy, by using micro observation data with the highest priority.

On the other hand, in the case where sunlight amount estimation is not possible with only micro observation data (S208/NO), in step S212, the communication section 14 receives macro estimation data from the server 40. Specifically, the communication section 14 receives weather information such as a weather forecast or the intensity of sunlight, structure information such as the position, height or shape of structures, and geographic information such as the inclination or geographic features of the ground, as macro estimation data, of the surroundings of the movement route candidates.

Next, in step S216, the guidance section 16 judges whether or not the weather information is effective, from among the macro estimation data. For example, the guidance section 16 judges that the weather information is not effective in the case where unexpected values are included or in the case where the acquired data is old, and judges that the weather information is effective in cases other than these.

In the case where the weather information is not effective (S216/NO), the process proceeds to step S224, which will be described later.

On the other hand, in the case where the weather information is effective (S216/YES), in step S220, the guidance section 16 determines the weather information to be used for sunlight amount estimation.

Next, in step S224, the guidance section 16 judges whether or not the structure information and the geographic information are effective, from among the macro estimation data. For example, the guidance section 16 judges that the structure information and the geographic information are not effective in the case where unexpected values are included or in the case where the acquired data is old, and determines that the structure information and the geographic information are effective in cases other than these.

In the case where the structure information and the geographic information are not effective (S224/NO), the process proceeds to step S236, which will be described later.

On the other hand, in the case where the structure information and the geographic information are effective (S224/YES), in step S228, the guidance section 16 performs a calculation of shaded regions based on the structure information and the geographic information. Specifically, the guidance section 16 first calculates the sun position based on the present time and present position. Then, the guidance section 16 calculates shaded regions formed by structures, based on the sun position, the structure information and the geographic information.

Next, in step S232, the guidance section 16 determines the calculated shaded regions to be used for sunlight amount estimation.

Then, in step S236, the guidance section 16 pedal ins sunlight amount estimation based on data capable of being used. More specifically, the guidance section 16 performs sunlight amount estimation, by using information determined to be used, from among the micro observation data, the weather information and the calculated shaded regions. For example, the guidance section 16 calculates an integration amount of estimated sunlight or ultraviolet rays, by supplementing or correcting an estimation of a sunlight state based on the micro observation data with the intensity of sunlight shown by the weather information or the calculated shaded regions.

Next, in step S240, the guidance section 16 determines a movement route candidate based on a result of the sunlight amount estimation. Specifically, the guidance section 16 determines a movement route candidate, which minimizes the calculated integration amount of sunlight or ultraviolet rays, as a movement route candidate to be guided for the user 8.

Heretofore, the detailed process in step S132 shown in FIG. 6 has been described.

(Supplementation)

While above the guidance section 16 determines a movement route candidate based on the micro observation data, or determines a movement route candidate to be guided based on micro observation data and macro estimation data, the present embodiment is not limited to such examples. For example, the guidance section 16 may determine a movement route candidate to be guided by selectively using either micro observation data or macro estimation data.

2-2. The Second Embodiment 2-2-1. Outline

The present embodiment is an embodiment in which the HMD 1 performs guidance to a movement route candidate which has a lesser amount of pollen dispersion. First, an outline of the present embodiment will be described by referring to FIG. 8.

FIG. 8 is an explanatory diagram which shows an outline of the navigation process according to a second embodiment. As shown in FIG. 8, the user 8A is wearing the HMD 1A, and is standing at a junction of a movement route candidate A and a movement route candidate B. Further, as shown in FIG. 8, while there are cedar trees in the surroundings of the movement route candidate A, the pollen of the cedar trees is dispersed to the entire region of the movement route candidate B, and is not dispersed to the movement route candidate A, due to the influence of wind.

Micro observation data in the present embodiment is real time information related to pollen. In the example shown in FIG. 8, the cameras 30A and 30B and smartphone 20 in the movement route candidate A observe, as micro observation data, that the wind orientation is from a direction where there are no cedar trees, and that pollen is not dispersed in the surroundings. Further, the cameras 30C and 30D and HMD 1B in the movement route candidate B observe, as micro observation data, that the wind orientation is from a direction where there are cedar trees, and that pollen is dispersed in the surroundings.

Further, macro estimation data in the present embodiment is information which shows a pollen dispersion state of the surroundings of the movement route candidates. For example, the macro estimation data includes information which shows vegetation releasing pollen present in the surroundings of the movement route candidates. In the example shown in FIG. 8, the HMD 1A receives, as macro estimation data, information which shows that cedar trees are planted along the movement route candidate A. Alternatively, the HMD 1A may acquire, as macro estimation data, a pollen dispersion forecast which shows the distribution of a pollen dispersion amount issued by the Meteorological Agency or the like, or a wind forecast or the like which includes the wind speed and wind orientation.

The HMD 1A determines a movement route candidate which minimizes the pollen amount to be received, based on such types of micro observation data and macro estimation data, and guides the movement direction for the user 8. Here, the HMD 1A determines a movement route candidate which minimizes the amount of a prescribed type of pollen. This is because there are various types of vegetation which release pollen, and the types of pollen which cause allergic reactions will differ depending on the person. The setting section 17 can set which type of pollen amount to minimize.

In more detail, first the estimation section 13 estimates a pollen dispersion state in the movement route candidates for each type of pollen, based on micro observation data such as pollen, wind speed and wind orientation observed in real time. Next, the guidance section 16 supplements or corrects the pollen dispersion state estimated based on the micro observation data with macro estimation data. Next, the guidance section 16 calculates, for each movement route candidate, an integration amount (pollen amount) in which the amount (influence amount) of a prescribed type of pollen is integrated per unit time or unit distance estimated to be received in the case of the user 8 moving in the movement route candidates, based on the pollen dispersion state estimated by the estimation section 13. Note that, hereinafter, calculating the pollen amount estimated to be received in the case when the user 8 moves from the present position to the destination will be called pollen amount estimation.

Also, the guidance section 16 performs guidance for the user 8 by prioritizing a movement route candidate which minimizes the pollen amount estimated to be received in the case where the user 8 moves from the present position to the destination. In the example shown in FIG. 8, the HMD 1A displays a guidance image P2, to the user 8, which guides the movement route candidate A, in which a prescribed type of pollen is not dispersed, by a map display.

Heretofore, an outline of the navigation process according to an embodiment of the present disclosure has been described. Since the configuration of the HMD 1 according to the present embodiment is the same as that of the above described first embodiment, a detailed description will be omitted here. Hereinafter, an operation process of the HMD 1 according to the present embodiment will be described.

2-2-2. Operation Process of the HMD

While the operation process of the HMD 1 according to the present embodiment is similar to that described above by referring to FIG. 6, the micro observation data in steps S120 and S124, and the process in step S132, are different. The micro observation data in steps S120 and S124 is real time information related to pollen, such as wind information such as wind orientation, wind speed or humidity, and a pollen amount of the surroundings. The operation process in step S132 by the HMD 1 according to the present embodiment will be described hereinafter by referring to FIG. 9.

FIG. 9 is a flowchart which shows the operations of the HMD 1 according to the second embodiment. As shown in FIG. 9, first in step S304, the guidance section 16 determines the micro observation data observed by the observation section 10, and the micro observation data received by the communication section 14, to be used for pollen amount estimation.

Next, in step S308, the guidance section 16 judges whether or not pollen amount estimation is possible with only micro observation data. For example, in the case where there are points in the movement route candidates which do not have micro observation data, or in the case where unexpected values are included, the guidance section 16 judges that pollen amount estimation is not possible, and in the case where the data amount or data acquisition period is sufficient, the guidance section 16 judges that pollen amount estimation is possible.

In the case where pollen amount estimation is possible with only micro observation data (S308/YES), the process proceeds to step S340, which will be described later.

On the other hand, in the case where pollen amount estimation is not possible with only micro observation data (S308/NO), in step S312, the communication section 14 receives a part of macro estimation data from the server 40. Here, the communication section 14 receives, as macro estimation data, a pollen dispersion forecast issued by the Meteorological Agency or other organizations.

Next, in step S316, the guidance section 16 judges whether or not the pollen dispersion forecast, which is received macro estimation data, is effective. For example, the guidance section 16 judges that the pollen dispersion forecast is not effective in the case where unexpected values are included or in the case where the acquired data is old, and judges that the pollen dispersion forecast is effective in cases other than these.

In the case where the pollen dispersion forecast is effective (S316/YES), in step S320, the guidance section 16 determines the pollen dispersion forecast to be used for pollen amount estimation. Then, the process proceeds to step S340, which will be described later.

On the other hand, in the case where the pollen dispersion forecast is not effective (S316/NO), in step S324, the communication section 14 receives an additional part of macro estimation data from the server 40. Here, the communication section 14 receives, as additional macro estimation data, distribution information of cedar trees in the surroundings of the movement route candidates, and a wind forecast such as the wind orientation and wind speed. In this way, in the present embodiment, the HMD 1 can gradually receive macro estimation data, until effective data can be received for pollen amount estimation. Therefore, the HMD 1 can reduce the communication amount compared to the case where all macro estimation data is received at once.

Next, in step S328, the guidance section 16 judges whether or not the distribution information of cedar trees and the wind forecast, which are received macro estimation data, are effective. For example, the guidance section 16 determines that the distribution information of cedar trees and the wind forecast are not effective in the case where unexpected values are included or in the case where the acquired data is old, and determines that the distribution information of cedar trees and the wind forecast are effective in cases other than these.

In the case where the distribution information of cedar trees and the wind forecast are not effective (S328/NO), in step S332, since the effective data is insufficient, the guidance section 16 determines that pollen amount estimation is not possible. In this case, the HMD 1 is not able to guide a movement route candidate for the user 8. The HMD 1 may notify the user 8 that guidance is not possible due to insufficient data.

On the other hand, in the case where the distribution information of cedar trees and the wind forecast are effective (S328/YES), in step S336, the guidance section 16 determines the distribution information of cedar trees and the wind forecast to be used for pollen amount estimation.

Then, in step S340, the guidance section 16 performs pollen amount estimation based on data capable of being used. In more detail, the guidance section 16 performs pollen amount estimation, by using information determined to be used from among the micro observation data, and the pollen dispersion forecast, the distribution information of cedar trees and the wind forecast, which are additional macro estimation data. For example, the guidance section 16 calculates an integration amount of pollen to be estimated, by supplementing or correcting an estimation of a pollen dispersion state based on the micro observation data with the pollen dispersion forecast, the distribution information of cedar trees and the wind forecast.

Next, in step S344, the guidance section 16 determines a movement route candidate based on the result of pollen amount estimation. Specifically, the guidance section 16 determines a movement route candidate, which minimizes the calculated integration amount of pollen, as a movement route candidate to be guided for the user 8.

Heretofore, an operation process of the HMD 1 according to the second embodiment has been described.

2-3. The Third Embodiment

The present embodiment is an embodiment in which guidance is performed, for a user 8 to get on a train, to a carriage with the most comfortable state inside the train. Hereinafter, the present embodiment will be described by referring to FIG. 10.

FIG. 10 is an explanatory diagram which shows an outline of the navigation process according to a third embodiment. As shown in FIG. 10, the user 8 is wearing the HMD 1, and is standing on the platform of a train station. A train 9 which includes carriages 9A, 9B and 9C is estimated to arrive in a few minutes at the platform where the user 8 is standing.

The HMD 1 estimates a degree of comfort of the cases where the user 8 boards each of the carriages, by receiving captured images (micro observation data) captured by cameras 30A, 30B and 30C installed in each of the carriages. For example, upon recognizing the present state of congestion in each of the carriages, the HMD 1 estimates a degree of comfort in accordance with congestion, by estimating the congestion in each of the carriages in accordance with the number of people lined up on the platform of the station, based on captured images of a camera 30, which is not illustrated, installed on the platform of the station. At this time, the HMD 1 may estimate congestion, by assuming that people preparing to disembark, from among the people riding in each of the carriages, will disembark at the station where the user 8 is standing.

In the example shown in FIG. 10, the HMD 1 estimates that the carriage 9A is very congested, based on captured images received from the camera 30A. Further, the HMD 1 estimates there while the carriage 9B is not congested, there are no vacant seats, based on captured images received from the camera 30B. Further, the HMD 1 estimates that while there are vacant seats in the carriage 9C, since there are drunken people who are not preparing to disembark, it will not be a comfortable state, based on captured images received from the camera 30C. At this time, the HMD 1 recognizes that there are drunken people in the carriage 9C, based on the redness of the faces of the passengers and that people are holding alcoholic beverages in their hands. Alternatively, the HMD 1 may recognize that there are drunken people, based on the voices of the passengers or the alcohol amount and odors included in the respiration of the passengers, which are observed by observation apparatuses installed in the carriage 9C.

The HMD 1 displays a guidance image P3, to the user 8, which performs guidance so as to recommend the carriage 9B and avoid the carriage 9C, based on these estimated states for each of the carriages.

Note that, while an example has been described here in which the HMD 1 guides to a comfortable carriage within the train 9 which will arrive in a few minutes, the present embodiment is not limited to such an example. For example, the HMD 1 may perform guidance so as to board the next train 9 or an additionally subsequent train, or may perform guidance that uses a different route, a taxi or the like. Further, the HMD 1 may perform guidance to a carriage near to the steps or escalators of the station at which the user 8 is planning to disembark. Further, the HMD 1 may perform guidance to a row of people lined up on the platform, so that the user 8 proceeds in a direction which will be empty after boarding the train, based on the inclination of passengers within the carriages.

Heretofore, the third embodiment has been described.

2-4. The Fourth Embodiment

The present embodiment is an embodiment in which the HMD 1 performs guidance to a movement route candidate which avoids wind, that is, to a movement route candidate with a lighter wind. Hereinafter, the navigation process according to the present embodiment will be described.

Micro observation data in the present embodiment is real time information related to wind. For example, the HMD 1 receives, as micro observation data, information which shows the wind speed, maximum wind, average wind, wind orientation or the like, which is estimated by observation apparatuses or other navigation apparatuses present in the surroundings of the movement route candidates.

Further, macro estimation data in the present embodiment is information which shows a state of the wind blowing in the surroundings of the movement route candidates. For example, macro estimation data includes structure information and geographic information of the surroundings of the movement route candidates. The reason for setting such information as macro estimation data is that the wind orientation is determined in accordance with geographic features, building wind blows at locations where buildings are close together, and the wind speed is weakened due to trees. Alternatively, the HMD 1 may acquire, as macro estimation data, a wind forecast which includes the wind speed and the wind orientation issued by the Meteorological Agency or the like.

The HMD 1 determines a movement route candidate in which the maximum wind amount to be received does not exceed an upper limit value, based on such micro observation data and macro estimation data, and guides the movement direction for the user 8.

More specifically, first the estimation section 13 estimates a state of the wind blowing in the movement route candidates, based on micro observation data such as the wind speed, maximum wind, average wind or wind orientation observed in real time. Next, the guidance section 16 supplements or corrects the state of the wind estimated based on micro observation data with macro estimation data. Next, the guidance section 16 calculates the wind amount (influence amount) per unit time or unit distance estimated to be received in the case when the user 8 moves in the movement route candidates, based on the state of the wind estimated by the estimation section 13.

Also, the guidance section 16 performs guidance for the user 8 by prioritizing a movement route candidate in which the wind amount estimated to be received in the case where the user 8 moves from the present position to destination does not exceed an upper limit value (a first threshold), that is, the maximum wind amount does not exceed an upper limit value. For example, the guidance section 16 guides a movement route candidate by avoiding locations where gusts are observed, or the surroundings of buildings where it is estimated that building wind will blow.

Heretofore, the navigation process according to the present embodiment has been described.

3. CONCLUSION

As described above, the HMD 1 can perform route guidance based on micro observation data, which is local information observed in real time. Further, in the case where it is difficult to perform route guidance with only micro observation data, the HMD 1 can perform route guidance by additionally combining macro estimation data.

As described in the first embodiment, the HMD 1 can guide, for the user 8, a movement route candidate which minimizes or maximizes an integration amount of incident sunlight or ultraviolet rays.

Further, as described in the second embodiment, the HMD 1 can guide, for the user 8, a movement route candidate which minimizes a received amount of pollen.

Further, as described in the third embodiment, the HMD 1 can guide, for the user 8, a carriage with the most comfortable state inside a train.

Further, as described in the fourth embodiment, the HMD 1 can guide, for the user 8, a movement route candidate which avoids wind.

It should be understood by those skilled in the art that various modifications, combinations, sub-combinations and alterations may occur depending on design requirements and other factors insofar as they are within the scope of the appended claims or the equivalents thereof.

Further, a computer program for causing hardware, such as a CPU, ROM and RAM built into an information processing apparatus to exhibit functions similar to each of the configurations the HMD 1 can be created. Further, a storage medium having this computer program stored therein can also be provided.

Additionally, the present technology may also be configured as below.

(1) A navigation apparatus including:

an estimation section which estimates first environmental information in a movement route candidate of an object based on observation information observed in real time in the movement route candidate;

an acquisition section which acquires second environmental information of a surrounding of the movement route candidate; and a guidance section which guides a movement direction for the object based on the first environmental information estimated by the estimation section and the second environmental information acquired by the acquisition section.

(2) The navigation apparatus according to (1), wherein the second environmental information is different from the first environmental information, and is information which is registered in advance with respect to a time and a location.

(3) The navigation apparatus according to (2), wherein the second environmental information includes sun position information and surrounding geographic information at an estimated arrival time of a point included in the movement route candidate.

(4) The navigation apparatus according to (2) or (3), wherein the guidance section is allowed to change the movement direction to be guided in accordance with a change in an estimated arrival time of a point included in the movement route candidate, or in accordance with a change in the first environmental information estimated by the estimation section.

(5) The navigation apparatus according to any one of (1) to (4), wherein the guidance section guides the movement direction based on a state of the object.

(6) The navigation apparatus according to any one of (1) to (5), wherein the observation information includes information observed by observation apparatuses installed in and near the movement route candidate.

(7) The navigation apparatus according to any one of (1) to (6), further including:

an observation section which observes the observation information of a surrounding of the object, wherein the estimation section estimates the first environmental information based additionally on the observation information observed by the observation section.

(8) The navigation apparatus according to (7), wherein the observation information includes the observation information observed by other navigation apparatuses present in and near the movement route candidate.

(9) The navigation apparatus according to any one of (1) to (8), wherein the guidance section estimates an influence amount per unit time or unit distance received from an external environment in a case where the object moves in the movement route candidate, and guides the movement direction based on the estimated influence amount.

(10) The navigation apparatus according to (9), wherein the guidance section guides the movement direction by prioritizing a movement route candidate which minimizes or maximizes an integration amount of the estimated influence amount.

(11) The navigation apparatus according to (9),
wherein the guidance section guides the movement direction by prioritizing a movement route candidate in which the estimated influence amount exceeds or does not exceed a first threshold.
(12) The navigation apparatus according to any one of (9) to (11), further including:
a measurement section which measures an actual integration amount obtained by integrating the influence amount actually received by the object from the external environment; and
a threshold setting section which sets a second threshold of the actual integration amount,
wherein the guidance section guides warning information which shows that the actual integration amount measured by the measurement section has exceeded or is likely to exceed the second threshold set by the threshold setting section.
(13) The navigation apparatus according to any one of (9) to (12),
wherein the observation information is real time information related to sunlight or an ultraviolet ray,
wherein the first environmental information is information related to sunlight or an ultraviolet ray of a case where the object moves in the movement route candidate, and
wherein the influence amount is an irradiation amount of emitted sunlight or an ultraviolet ray of a case where the object moves in the movement route candidate.
(14) The navigation apparatus according to (13),
wherein the observation information includes images captured in and near the movement route candidate, and
wherein the estimation section estimates the first environmental information based on a shaded region and a sun exposed region recognized from the images.
(15) The navigation apparatus according to (13) or (14),
wherein the observation information includes information which shows heights and leaf amounts of trees present in and near the movement route candidate.
(16) The navigation apparatus according to any one of (13) to (15),
wherein the observation information includes information which shows moving objects present in and near the movement route candidate.
(17) The navigation apparatus according to any one of (13) to (16),
wherein the observation information includes information which shows reflections from reflective bodies in the movement route candidate.
(18) The navigation apparatus according to (9),
wherein the observation information is real time information related to pollen,
wherein the first environmental information is information related to received pollen of a case where the object moves in the movement route candidate, and
wherein the influence amount is an amount of a received prescribed type of pollen of a case where the object moves in the movement route candidate.
(19) The navigation apparatus according to (18),
wherein the second environmental information includes information which shows vegetation releasing pollen present in a surrounding of the movement route candidate.
(20) The navigation apparatus according to (18) or (19),
wherein the observation information includes a wind speed and a wind orientation in the movement route candidate.
(21) The navigation apparatus according to (11),
wherein the observation information is real time information related to wind,
wherein the first environmental information is information related to a received wind amount of a case where the object moves in the movement route candidate,
wherein the influence amount is a received wind amount of a case where the object moves in the movement route candidate, and
wherein the guidance section guides the movement direction by prioritizing a movement route candidate in which the estimated influence amount does not exceed the first threshold.
(22) The navigation apparatus according to any one of (1) to (21),
wherein the first environmental information is weather forecast information in the movement route candidate.
(23) The navigation apparatus according to any one of (1) to (22), further including:
a destination setting section which sets a destination,
wherein the movement route candidate is a candidate of a movement route from a present position of the object to the destination.
(24) The navigation apparatus according to (23),
wherein the destination setting section is allowed to change the destination in accordance with a change in an estimated arrival time of a point included in the movement route candidate, or in accordance with a change in the first environmental information estimated by the estimation section.
(25) A non-transitory computer-readable storage medium having a program stored therein, the program causing a computer to function as:
estimating first environmental information in a movement route candidate of an object based on observation information observed in real time in the movement route candidate;
acquiring second environmental information of a surrounding of the movement route candidate; and
guiding a movement direction for the object based on the estimated first environmental information and the acquired second environmental information.

What is claimed is:
1. A navigation apparatus comprising:
an estimation section which estimates first environmental information in a movement route candidate of an object based on observation information observed in real time in the movement route candidate;
an acquisition section which acquires second environmental information of a surrounding of the movement route candidate; and
a guidance section which guides a movement direction for the object along the movement route candidate based on the first environmental information estimated by the estimation section and the second environmental information acquired by the acquisition section,
wherein the second environmental information is different from the first environmental information, and the second environmental information comprises information which is registered in advance in correlation with a time and a location,
wherein the time corresponds to a time of day at which the movement direction is guided, and the location corresponds to a location of the surrounding of the movement route candidate, and
wherein the estimation section, the acquisition section, and the guidance section are each implemented via at least one processor.

2. The navigation apparatus according to claim 1,
wherein the second environmental information includes sun position information and surrounding geographic information at an estimated arrival time of a point included in the movement route candidate.

3. The navigation apparatus according to claim 1,
wherein the guidance section is allowed to change the movement direction to be guided in accordance with a change in an estimated arrival time of a point included in the movement route candidate, or in accordance with a change in the first environmental information estimated by the estimation section.

4. The navigation apparatus according to claim 1,
wherein the guidance section guides the movement direction based on a state of the object.

5. The navigation apparatus according to claim 1,
wherein the observation information includes information observed by observation apparatuses installed in and near the movement route candidate.

6. The navigation apparatus according to claim 1, further comprising:
an observation section which observes the observation information of a surrounding of the object,
wherein the estimation section estimates the first environmental information based additionally on the observation information observed by the observation section, and
wherein the observation section is implemented via at least one processor.

7. The navigation apparatus according to claim 6,
wherein the observation information includes the observation information observed by other navigation apparatuses present in and near the movement route candidate.

8. The navigation apparatus according to claim 1,
wherein the guidance section estimates an influence amount per unit time or unit distance received from an external environment in a case where the object moves in the movement route candidate, and guides the movement direction based on the estimated influence amount.

9. The navigation apparatus according to claim 8,
wherein the guidance section guides the movement direction by prioritizing a movement route candidate which minimizes or maximizes an integration amount of the estimated influence amount.

10. The navigation apparatus according to claim 8,
wherein the guidance section guides the movement direction by prioritizing a movement route candidate in which the estimated influence amount exceeds or does not exceed a first threshold.

11. The navigation apparatus according to claim 8, further comprising:
a measurement section which measures an actual integration amount obtained by integrating the influence amount actually received by the object from the external environment; and
a threshold setting section which sets a second threshold of the actual integration amount,
wherein the guidance section guides warning information which shows that the actual integration amount measured by the measurement section has exceeded or is likely to exceed the second threshold set by the threshold setting section, and
wherein the measurement section and the threshold setting section are each implemented via at least one processor.

12. The navigation apparatus according to claim 8,
wherein the observation information is real time information related to sunlight or an ultraviolet ray,
wherein the first environmental information is information related to sunlight or an ultraviolet ray of a case where the object moves in the movement route candidate, and
wherein the influence amount is an irradiation amount of emitted sunlight or an ultraviolet ray of a case where the object moves in the movement route candidate.

13. The navigation apparatus according to claim 12,
wherein the observation information includes images captured in and near the movement route candidate, and
wherein the estimation section estimates the first environmental information based on a shaded region and a sun exposed region recognized from the images.

14. The navigation apparatus according to claim 12,
wherein the observation information includes information which shows heights and leaf amounts of trees present in and near the movement route candidate.

15. The navigation apparatus according to claim 12,
wherein the observation information includes information which shows moving objects present in and near the movement route candidate.

16. The navigation apparatus according to claim 12,
wherein the observation information includes information which shows reflections from reflective bodies in the movement route candidate.

17. The navigation apparatus according to claim 8,
wherein the observation information is real time information related to pollen,
wherein the first environmental information is information related to received pollen of a case where the object moves in the movement route candidate, and
wherein the influence amount is an amount of a received prescribed type of pollen of a case where the object moves in the movement route candidate.

18. The navigation apparatus according to claim 17,
wherein the second environmental information includes information which shows vegetation releasing pollen present in a surrounding of the movement route candidate.

19. The navigation apparatus according to claim 17,
wherein the observation information includes a wind speed and a wind orientation in the movement route candidate.

20. The navigation apparatus according to claim 10,
wherein the observation information is real time information related to wind,
wherein the first environmental information is information related to a received wind amount of a case where the object moves in the movement route candidate,
wherein the influence amount is a received wind amount of a case where the object moves in the movement route candidate, and
wherein the guidance section guides the movement direction by prioritizing a movement route candidate in which the estimated influence amount does not exceed the first threshold.

21. The navigation apparatus according to claim 1,
wherein the first environmental information is weather forecast information in the movement route candidate.

22. The navigation apparatus according to claim 1, further comprising:
  a destination setting section which sets a destination,
  wherein the movement route candidate is a candidate of a movement route from a present position of the object to the destination, and
  wherein the destination setting section is implemented via at least one processor.

23. The navigation apparatus according to claim 22,
  wherein the destination setting section is allowed to change the destination in accordance with a change in an estimated arrival time of a point included in the movement route candidate, or in accordance with a change in the first environmental information estimated by the estimation section.

24. A non-transitory computer-readable storage medium having embodied thereon a program, which when executed by a computer causes the computer to execute a method, the method comprising:
  estimating first environmental information in a movement route candidate of an object based on observation information observed in real time in the movement route candidate;
  acquiring second environmental information of a surrounding of the movement route candidate; and
  guiding a movement direction for the object along the movement route candidate based on the estimated first environmental information and the acquired second environmental information,
  wherein the second environmental information is different from the first environmental information, and the second environmental information comprises information which is registered in advance in correlation with a time and a location, and
  wherein the time corresponds to a time of day at which the movement direction is guided, and the location corresponds to a location of the surrounding of the movement route candidate.

25. The navigation apparatus according to claim 1,
  wherein the second environmental information comprises advance-registered information on shaded regions corresponding to the location of the surrounding of the movement route candidate, in correlation with the time of day at which the movement direction is guided.

* * * * *